(12) United States Patent
Härtlein et al.

(10) Patent No.: US 11,338,532 B2
(45) Date of Patent: May 24, 2022

(54) DEVICE AND METHOD FOR SEPARATING MATERIALS WITH DIFFERENT DEGREES OF FLOWABILITY

(71) Applicant: Nordischer Maschinenbau Rud. Baader GmbH + Co. KG, Lübeck (DE)

(72) Inventors: Joachim Härtlein, Bad Schwartau (DE); Uwe Karsten, Kühlungsborn (DE); Olaf Schwarz, Kahlenberg (DE); Michael Fuchs, Pönitz (DE); Julia Fleischmann, Lübeck (DE); Norbert Sass, Selmsdorf (DE)

(73) Assignee: Nordischer Maschinenbau Rud. Baader GmbH + Co. KG, Lübeck (DE)

( * ) Notice: Subject to any disclaimer, the term of this patent is extended or adjusted under 35 U.S.C. 154(b) by 0 days.

(21) Appl. No.: 17/415,569

(22) PCT Filed: Dec. 16, 2019

(86) PCT No.: PCT/EP2019/085406
§ 371 (c)(1),
(2) Date: Jun. 17, 2021

(87) PCT Pub. No.: WO2020/127086
PCT Pub. Date: Jun. 25, 2020

(65) Prior Publication Data
US 2022/0040948 A1  Feb. 10, 2022

(30) Foreign Application Priority Data

Dec. 21, 2018 (DE) .......................... 102018133444.3

(51) Int. Cl.
*A22C 17/04* (2006.01)
*B30B 9/24* (2006.01)

(52) U.S. Cl.
CPC .............. *B30B 9/241* (2013.01); *A22C 17/04* (2013.01)

(58) Field of Classification Search
CPC ..... B30B 9/241; A22B 5/0035; A22C 17/004; A22C 17/04
See application file for complete search history.

(56) References Cited

U.S. PATENT DOCUMENTS

| 3,829,931 A | * | 8/1974 | Suerbaum | ............... A22C 17/04 452/138 |
| 4,348,290 A | * | 9/1982 | Schipper | ................. B30B 9/241 210/783 |

(Continued)

FOREIGN PATENT DOCUMENTS

| CN | 1483515 A | 3/2004 |
| CN | 101462373 A | 6/2009 |

(Continued)

OTHER PUBLICATIONS

International Search Report dated Mar. 13, 2020; International Application No. PCT/EP2019/085406.

*Primary Examiner* — Matthew Katcoff
(74) *Attorney, Agent, or Firm* — Dinsmore & Shohl LLP

(57) ABSTRACT

An apparatus for separating materials with different flowability has a rotationally driven hollow drum with a perforated peripheral surface, stripping means for stripping away material, and a continuous compression belt pressed from outside onto the drum by wrapping around part of the circumference of the drum, an intake wedge for the material. The belt is mounted by a drive roller and bearing roller. The drive roller controllably variably presses into a pressing position against the drum, separated by the belt. The drive roller position is adjustably set by a first positioning device via a control device, with a first end abutment element for mechanical position limitation. Part of the first positioning (Continued)

device comes into blocking contact with a first counter-surface of the first end abutment element in the pressing position of the drive roller and the first counter-surface of the first end abutment element is adjustable by the control device.

20 Claims, 6 Drawing Sheets

(56) References Cited

U.S. PATENT DOCUMENTS

| | | | |
|---|---|---|---|
| 4,637,094 A * | 1/1987 | Matsubayashi | B30B 9/241 |
| | | | 452/138 |
| 5,085,140 A * | 2/1992 | Kunig | B30B 9/241 |
| | | | 100/121 |
| 5,385,244 A | 1/1995 | Kunig et al. | |
| 7,131,604 B2 | 11/2006 | Enomura | |
| 8,689,682 B2 | 4/2014 | Rose et al. | |
| 9,089,876 B2 * | 7/2015 | Hoppe | B30B 9/241 |
| 2010/0084319 A1 | 4/2010 | Hahn et al. | |
| 2017/0203306 A1 | 7/2017 | Penkl et al. | |
| 2021/0037837 A1 * | 2/2021 | Gunther | A22C 17/04 |

FOREIGN PATENT DOCUMENTS

| | | |
|---|---|---|
| CN | 102740715 A | 10/2012 |
| CN | 106413906 A | 2/2017 |
| DE | 202004014365 U1 | 11/2004 |
| DE | 202007004473 U1 | 6/2007 |
| GB | 2455643 A | 6/2009 |

* cited by examiner

DEVICE AND METHOD FOR SEPARATING MATERIALS WITH DIFFERENT DEGREES OF FLOWABILITY

CROSS REFERENCE TO RELATED APPLICATION

This application is the U.S. National Stage of PCT/EP2019/085406 filed Dec. 16, 2019, which claims priority to Germany Application No. 102018133444.3, filed Dec. 21, 2018, the entire content of both are incorporated herein by reference in their entirety.

FIELD OF THE INVENTION

The present invention relates to an apparatus for separating materials with different degrees of flowability. In addition, the present invention relates to a method for setting up an apparatus for separating materials with different degrees of flowability and a method for operating such an apparatus.

BACKGROUND OF THE INVENTION

Such apparatuses and methods are used in various industrial sectors. Basically, it is possible to separate materials with a flow behaviour that differs from each other. Such apparatuses and methods are used, for example, in the processing of animal/fish bodies for separating skin, meat and/or sinew parts from animal bones or fish bones. They are also used for separating the pulp from the peel, stems, pips or stones of vegetables or fruit. Another area of use is the separation of composite packaging in particular, for example beverage packaging cartons which consist of cardboard boxes coated with plastic film and/or aluminium foil.

The apparatuses for separating materials with different degrees of flowability, also known as separators, generally comprise a hollow drum provided with a perforated peripheral surface and a compression belt operatively connected to the hollow drum in a partial circumferential region. The compression belt and hollow drum are both driven in each case. The material to be pressed and separated enters an intake region between the resilient compression belt and the perforated hollow drum. In this intake region, the compression belt together with the hollow drum forms an intake wedge for the material to be pressed.

Due to different degrees of flowability of the partial components of the material to be pressed, the more flowable components are pushed through the perforated peripheral surface of the hollow drum from the outside to the inside.

A disadvantage of the known apparatuses and methods is that high pressing forces, which often have an adverse effect on the compression belt, can act during intake of the material to be pressed as well as during separation of the materials with different degrees of flowability. For example, this may result in undesirable overstretching of the compression belt. To counteract functional impairment of and/or damage to the compression belt, support elements of various designs, which are arranged on the side of the compression belt directed away from the material to be separated, are used to support the compression belt. The use of support chains has proven successful in so-called soft separators. The advantage of the support chain is a more even loading of the compression belt guided over it. Normally, the support chain presses the compression belt against the peripheral surface of the hollow drum in a partial region where the belt wraps around the hollow drum. This brings about guidance of the compression belt, in particular in the region upstream of the pressing roller and thus reduces the occurrence of functional impairment of and/or damage to the compression belt. The support chains are correspondingly highly pre-tensioned to achieve the desired support effect. Although this ensures adequate guidance and support of the compression belt, high pre-tension of the support chain leads to the signs of severe wear on all components of the support chain and to severe strain on the support chain bearings.

Such support chains are usually supported by means of rollers, one roller being designed as a drive roller, while the other is a tensioning roller. The pre-tension of the support chain is adjustable using the variable-position tensioning roller such that the pressing force which the support chain exerts on the compression belt is also adjustable. It is known from prior art to readjust the pressing force of the support chain on the compression belt by moving the tensioning roller, by using a hydraulic system for example. If, for example, the drive roller is pushed away from the hollow drum as a result of a mechanical resistance of the material to be pressed, the tensioning roller is moved in such a way that the pressing force of the support chain onto the compression belt remains constant overall. Such apparatuses are disclosed, for example, by documents DE 20 2004 014 365 U1 and DE 20 2007 004 473 U1.

The support chain is subject to high wear due to the high pre-tension and the associated high forces permanently acting on it. These signs of wear, particularly on the holes of the chain links, show up as widening of the holes which causes the support chain to elongate overall. Above an elongation of approx. 2.5%, experience shows that they are no longer fit for use; in addition, it is frequently necessary to regularly readjust the tensioning rollers due to elongation of the chain. The compression belt is also subject to a significantly reduced lifetime as high pre-tension of the support chain is associated with correspondingly high supporting forces which act on the compression belt.

The hollow drums are also subject to wear. Their peripheral surfaces have to be ground at regular intervals thereby reducing their diameter. A change in the diameter of the hollow drum may have an adverse effect on wear and yield during the separation process. To counteract these adverse effects, the position of the drive roller relative to the hollow drum must also be adjusted in addition to the tensioning roller. Adjustment is carried out regularly by loosening and readjusting a shaft clamping connection.

SUMMARY OF THE INVENTION

It is therefore the object of the present invention to propose an automatically self-adjusting apparatus which guarantees the lowest possible wear with the best possible separation result. In addition, the object consists of compensating by automatic adjustment for dimensions and/or characteristics of the apparatus components which change due to wear. The object is further to provide a corresponding method for automatically setting up such an apparatus and for operating such an apparatus.

The object is achieved by an apparatus with the following features: a rotationally driven hollow drum having a perforated peripheral surface; stripping means for stripping away the material to be pressed on the hollow drum; a continuous compression belt which can be pressed from the outside onto the hollow drum by wrapping around a part of the circumference of the hollow drum, and which forms an intake wedge together with the hollow drum for the material to be pressed, wherein the compression belt is mounted by means of at least one drive roller and at least one bearing roller, and at least the drive roller is designed such that it can be pressed in a controllably variable manner into a pressing position against the hollow drum, separated by the compression belt, the position of the drive roller relative to the hollow drum being adjustably set by means of a first positioning device via a control device, further comprising a first end abutment element designed for mechanical position limitation, with which at least one part of the first positioning device comes into blocking contact with a first counter-surface of the first end abutment element in the pressing position of the drive roller and wherein the first counter-surface of the first end abutment element is designed such that its position can be adjusted by means of the control device. In this way, it is possible to adjust the pressing position of the drive roller accurately by means of the first end abutment element in a controllably variable manner. In the pressing position, one part of the first positioning device comes into blocking contact with the first counter-surface, i.e. in this position the counter-surface serves as a counter-bearing. If material to be pressed gets between the peripheral surface of the hollow drum and the compression belt via the intake wedge, the drive roller can yield against the pressure exerted by means of the positioning device in the direction of the hollow drum. In this case, the one part of the first positioning device is released at a slight distance from the first counter-surface such that the entire compressive force which the first positioning device exerts on the drive roller acts upon the material to be pressed. This has the advantage that when material to be pressed passes through, it is processed with the correspondingly high pressures required but, in the event of less or no material to be pressed at all between the compression belt and the hollow drum, the pressing force is significantly reduced and thus the wear of the compression belt and/or hollow drum is significantly reduced. Other advantages which emerge in combination with the control device according to the invention are described below in conjunction with the method according to the invention. The rollers are preferably mounted by means of adjustable eccentric clamping devices for position adjustment. The drive roller is additionally designed as a pressing roller; thus it has a dual function.

An expedient embodiment of the invention is characterised in that an apparatus has a rotationally driven continuous supporting means configured to support the compression belt, the compression belt being mounted by the drive roller and at least one tensioning roller and at least the position of the tensioning roller is designed to be adjustable into a tensioning position by means of a second positioning device via the control device for adjusting the pre-tension of the supporting means, and further a second end abutment element designed for mechanical position limitation with which at least one part of the second positioning device comes into blocking contact with a second counter-surface of the second end abutment element in the tensioning position, and the second counter-surface of the second end abutment element being designed such that its position can be adjusted by means of the control device. This has the advantage that the pre-tension of the supporting means is designed to be automatically adjustable. The pre-tension of the supporting means can be correspondingly adjusted by selecting the position of the second counter-surface of the second end abutment element. The pre-tension of the supporting means can be optimally pre-set depending on the characteristics of the material to be pressed and processed and the material characteristics of the compression belt used. Due to the mechanical block by the second counter-surface, the supporting means is only pretensioned insofar as to take the loosening out of it. Consequently, there is comparatively little pre-tensioning of the supporting means, as the tensioning force exerted by means of the second positioning device is at least substantially absorbed via the second counter-surface element of the second end abutment element. If, as described previously, the compression belt yields due to material to be pressed located between the hollow drum and the compression belt, then the tension of the supporting means also increases. The tensioning roller is moved out of the tensioning position against the tensioning force generated by the second positioning device such that the part of the second positioning device is freed from the second counter-surface and the entire tensioning force now acts on the supporting means via the tensioning roller. In other words, according to the invention, the pre-tension of the supporting means is increased as needed at the moment when the passage of material to be pressed requires it. Otherwise, the pre-tension of the support chain is reduced to a minimum. A further advantage is that the intake wedge is configured to be variable by selecting the pre-tension by means of the position of the second counter-surface. Depending on the type of material to be pressed and separated, the intake wedge can be optimally adapted in this manner within a broad variation range to various materials to be pressed to ensure an optimum intake behaviour of the material to be pressed in each case. A preferred development of the invention is characterised in that the supporting means is a support chain or a support belt. In soft separators in particular, a support chain is used.

A further expedient embodiment of the invention is characterised in that the positioning devices each comprise hydraulically operated pressure cylinders, so-called hydraulic cylinders. The required high pressures are achieved by means of the hydraulically operated pressure cylinders. The desired working pressure in each case is applied to the pressure cylinders by means of the control device. The hydraulic system to which the pressure cylinders are connected is preferably designed in such a manner that the pressure cylinders are configured to rebound against the working pressure. In this manner, both the drive roller and also the tensioning roller can yield accordingly.

According to a further preferred embodiment, the counter-surfaces of the end abutment elements are each designed to be self-locking. This has the advantage that even when force is applied to the respective counter-surfaces, they always retain their position once it has been set. It is thus particularly easy to ensure that the position of the counter-surfaces, adjusted in a controllably variable manner, is maintained.

A further expedient embodiment of the invention is characterised in that the counter-surfaces of the end abutment elements each have an electric-motor-operated spindle drive, which can be controlled by means of the control device, for adjusting the position of the counter-surfaces. The spindle drive has the advantage that it is both self-locking and also adjustable when high axial forces are applied to it and in addition it allows precise positioning of the counter-surfaces.

According to a further preferred embodiment of the invention, the end abutment elements each comprise measuring means connected to the control device which are designed to detect that the respective counter-surface is in blocking contact. Advantageously, it is thus automatically detected that the counter-surfaces are in blocking contact.

An advantageous development of the invention is characterised in that the measuring means are designed as contact-free electrical limit switches. In this manner, it is possible to precisely detect when the blocking contact position is reached and relay it to the control device.

A preferred development of the invention is characterised in that the measuring means each have current measuring devices for determining the current consumption of the spindle drive, and the control device is designed to detect that the respective counter-surface is in blocking contact in the event of an increase in the current consumption compared to the nominal current consumption which is detected during position adjustment. The said position is advantageously determined without further sensor means. In this way, the electric motor of the spindle drive is used for detecting the blocking contact position at the same time. When the blocking contact is reached, the torque to be applied by the electric motor increases abruptly. This also leads to an increase in current consumption which is significantly greater than the regular nominal current consumption.

According to a further preferred development, the control device is designed to store the positions of the respective counter-surfaces using memory means for at least one type of material to be pressed and, after an operator has selected one of the material types to be pressed, to automatically adjust the counter-surfaces based on the stored positions. Thus it is advantageously possible to automatically adjust the respective positions of the counter-surfaces in a repeatable manner. Once determined positions of the counter-surfaces, which have been determined and set with regard to a type of material to be pressed, can thus be easily selected by an operator of the apparatus and automatically adjusted by means of the control device. This achieves considerable ease of use and at the same time prevents incorrect adjustment of the machine due to selecting unsuitable settings for the particular material to be pressed.

In addition, the invention relates to a method for setting up an apparatus for separating materials with different degrees of flowability, wherein the apparatus forms a rotationally driven hollow drum having a perforated peripheral surface, stripping means for stripping away the material to be pressed on the hollow drum, a continuous compression belt which can be pressed from the outside onto the hollow drum by wrapping around a part of the circumference of the hollow drum, and which forms an intake wedge together with the hollow drum for the material to be pressed, wherein the compression belt is mounted by means of at least one drive roller and at least one bearing roller, and at least the drive roller is designed such that it can be pressed in a controllably variable manner into a pressing position against the hollow drum, separated by the compression belt, the position of the drive roller relative to the hollow drum being adjustably set by means of a first positioning device, which comprises at least one hydraulically operated first pressure cylinder, via a control device, further comprising a first end abutment element designed for mechanical position limitation, with which at least one part of the first positioning device comes into blocking contact with a first counter-surface of the first end abutment element in the pressing position of the drive roller and wherein the first counter-surface of the first end abutment element is designed such that its position can be adjusted by means of the control device, and at least the following steps are carried out by means of the control device: Moving the first counter-surface of the first end abutment element into a first standby position in such a manner that the first positioning device can be positioned without restriction; positioning the drive roller into the pressing position by means of the first positioning device by applying a pressing test pressure to the first pressure cylinder such that the drive roller rests against the hollow drum with a predetermined test pressure force via the compression belt; moving the first counter-surface of the first end abutment element from the first standby position into a first contact position in which the first counter-surface comes into blocking contact with at least one part of the first positioning device; and applying a pressing working pressure, which is greater than the pressing test pressure, to the first pressure cylinder. The method according to the invention is preferably carried out before each start-up of the apparatus and in this way an initial calibration is performed. In particular, the method is carried out after each change of machine components, for example after replacing the hollow drum, to recalibrate the machine.

The method according to the invention has a number of advantages. The drive roller is moved into the pressing position with a pressing test pressure which is many times lower than the actual pressing working pressure. This step indirectly determines by measurement the exact pressing position which depends, for example, on the current diameter of the hollow drum, the thickness and material characteristics of the compression belt and if necessary of the supporting means. In this way, determination of the pressing position of the drive roller takes place completely automatically. By subsequently moving the first counter-surface of the first end abutment element from the first standby position into the first contact position, the determined pressing position is "transferred" to the position of the first counter-surface. The at least one part of the first positioning device now comes into blocking contact with the first counter-surface and is "supported" against it. In the next step, the pressing working pressure, which is greater than the pressing test pressure, is applied to the first pressure cylinder. Due to the blocking contact, the pressing working pressure now acts at least substantially against the first counter-surface. Thus only a reduced pressure acts on compression belt and hollow drum such that they are subject to considerably reduced wear.

A further advantage is that not only is the magnitude of the pressure variably adjustable, but in addition a setting can be selected in which a gap of a predetermined width remains between the compression belt and hollow drum for drawing in the material to be pressed, for example to optimally process recycling products as material to be pressed.

As soon as material to be pressed gets between the peripheral surface of the hollow drum and the compression belt, the drive roller yields, as previously described, and the at least one part of the first positioning device is released at a slight distance from the first counter-surface out of the blocking contact. As a result, the entire pressing working pressure, starting from the drive roller via the supporting means if necessary, the compression belt as well as the material to be pressed located between the compression belt and the peripheral surface of the hollow drum, acts on the hollow drum.

According to a further preferred embodiment of the invention, the apparatus comprises a rotationally driven continuous supporting means configured to support the compression belt, the compression belt being mounted by the drive roller and at least one tensioning roller and at least the position of the tensioning roller being designed to be adjustable into a tensioning position by means of a second positioning device via the control device for adjusting the pre-tension of the supporting means, and further a second end abutment element designed for mechanical position limitation with which at least one part of the second positioning device, which comprises at least one hydraulically operated second pressure cylinder, comes into blocking contact with a second counter-surface of the second end abutment element in the tensioning position, and wherein the second counter-surface of the second end abutment element is designed such that its position can be adjusted by means of the control device, and the following further steps are carried out by means of the control device: Moving the second counter-surface of the second end abutment element into a second standby position in such a manner that the second positioning device can be positioned without restriction; positioning the tensioning roller into a tensioning position by means of the second positioning device by applying a tensioning test pressure to the second pressure cylinder such that a predetermined pre-tension is applied to the supporting means; moving the second counter-surface of the second end abutment element from the second standby position into a second contact position in which the second counter-surface comes into blocking contact with at least one part of the second positioning device; and applying a tensioning working pressure, which is greater than the tensioning test pressure, to the second pressure cylinder. According to the invention, positioning of the tensioning roller and the second end abutment device is dealt with in a similar way to positioning of the drive roller and the first end abutment device. Here, too, an indirect method by measurement first positions the tensioning roller into the tensioning position by applying a tensioning test pressure, which is many times lower than the tensioning working pressure, to the second pressure cylinder. The tensioning test pressure is preferably selected to just take the slack out of the supporting means. An elongation of the supporting means caused by wear is automatically detected in this way. By moving the second counter-surface from the second standby position into the second contact position, the determined tensioning position is "transferred" to the second counter-surface. After apply the tensioning working pressure to the second pressure cylinder, the at least one part of the second positioning device rests against the second counter-surface in blocking contact. Due to this mechanical abutment, only a low pre-tension is applied to the supporting means and thus the wear of all associated components is considerably reduced. Only when material to be pressed gets between the peripheral surface of the hollow drum and the compression belt, which leads to the tensioning roller yielding against the application of force by the second pressure cylinder, does the at least one part of the second positioning device leave the blocking contact with the second counter-surface and the entire tensioning working pressure acts on the supporting means via the second pressure cylinder and the tensioning roller for pre-tensioning.

A preferred development of the invention is characterised in that before applying the pressing working pressure to the first pressure cylinder, the drive roller is moved from the first pressing position by means of the first positioning device into a first release position in such a manner that the compression belt rests on the hollow drum at best free from pressing force and the first counter-surface of the first end abutment element is moved from the first contact position into a differential contact position deviating therefrom by a predetermined first distance. Advantageously, the pressure of the compression belt against the peripheral surface of the hollow drum can be adjusted within a wide range in this way. Depending on the predetermined distance, the drive roller can be positioned closer to the hollow drum, for example, to run higher working pressures due to a certain compression of the compression belt. By selecting the first distance, which results in a position of the drive roller further away from the hollow drum, it is also possible to run lower working pressures or to provide more space for the material to be pressed between the peripheral surface of the hollow drum and the compression belt. In any case, the contact pressure of the compression belt can thus be optimally adjusted to the material to be pressed and processed in terms of the highest possible yield with simultaneously low wear of the apparatus. A further advantage is that by specifying the drive roller position, the intake wedge is also configured to be controllable and therefore variable.

A further expedient embodiment of the invention is characterised in that, before applying the tensioning working pressure to the second pressure cylinder, the tensioning roller is moved by means of the second positioning device from the tensioning position into a second release position in such a manner that the supporting means is at least substantially free from pre-tension and the second counter-surface of the second end abutment element is moved from the second contact position into a differential tensioning position, deviating therefrom by a predetermined second distance. By specifying the second distance, it is possible to optimally adjust the pre-tension of the supporting means. The pre-tension can thus be optimally adapted to different requirements. Depending on the type of material to be pressed, this ensures optimal support of the compression belt on the one hand while achieving the lowest possible wear on the other hand. In addition, specifying the second distance provides the opportunity to vary the intake wedge and adjust it optimally for various materials to be pressed.

According to a further preferred embodiment of the invention, the counter-surfaces of the end abutment elements self-lock. A further expedient embodiment of the invention is characterised in that the counter-surfaces of the end abutment elements are each adjusted by means of electric motor spindle drives controllable via the control device. According to a further preferred embodiment, the method is characterised by determining the current consumption of the respective spindle drive by means of current measuring devices during position adjustment of the respective counter-surface and detecting that the respective counter-surface is in blocking contact in the event of an increase in the current consumption compared to the nominal current consumption of the spindle drive which is detected during position adjustment. The advantages to the aforementioned method features have already been explained in detail in connection with the apparatus according to the invention, to which reference is also made here in connection with the method according to the invention.

An advantageous development of the invention is characterised by detecting the blocking contact using contact-free position sensors or electrical limit switches. In addition, there is provision for storing the positions of the respective counter-surfaces using memory means of the control device for at least one type of material to be pressed and, after an operator has selected the material type to be pressed, for automatically adjusting the position of the respective counter-surfaces based on the stored positions. The advantages associated with the developments mentioned have already been explained in detail in connection with the apparatus according to the invention, to which reference is therefore made here.

In addition, the invention relates to a method for operating an apparatus for separating materials with different degrees of flowability, comprising the steps: Performing the previously mentioned method for setting up the apparatus; performing separation of the materials with different degrees of flowability by actuating the drive roller; repeatedly interrupting the performance of separating the materials and performing the method for setting up the apparatus according to the previously described method.

BRIEF DESCRIPTION OF THE DRAWINGS

Further preferred and/or expedient features and embodiments of the invention are disclosed herein. Especially preferred embodiments are explained in greater detail with reference to the attached drawing. The drawing shows.

DETAILED DESCRIPTION OF THE PREFERRED EMBODIMENT

Figure 1:
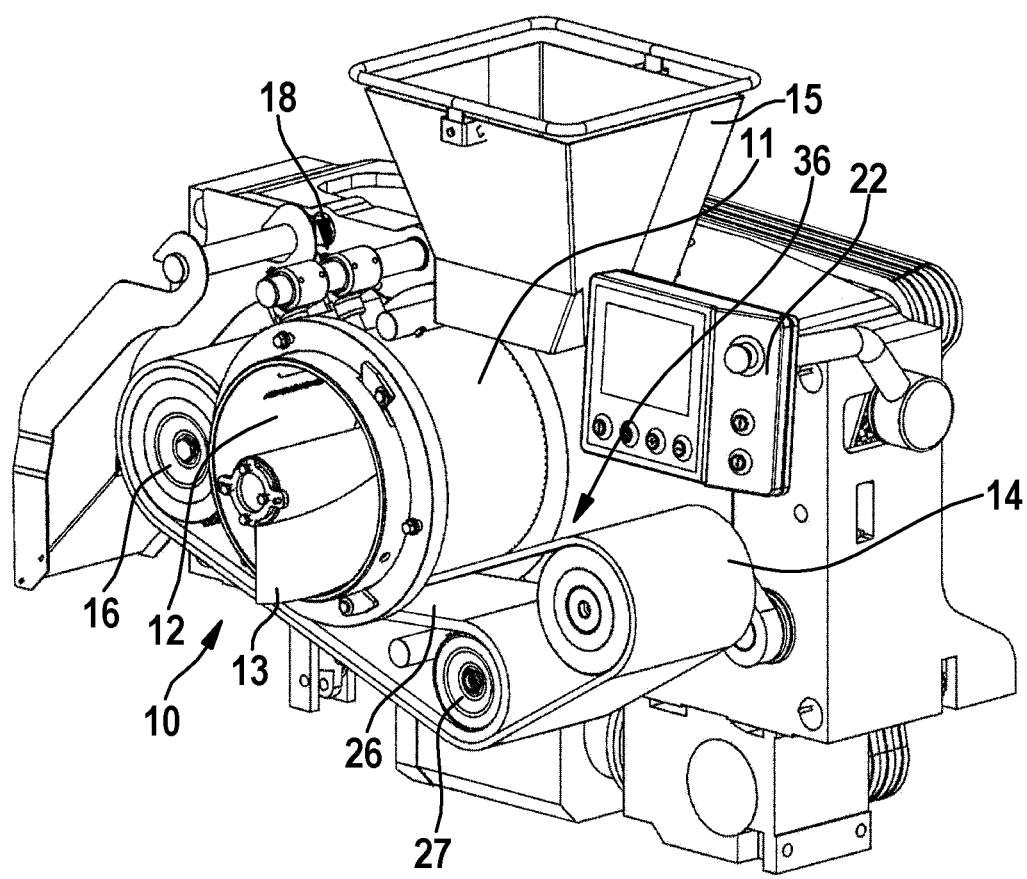
FIG. 1 is a perspective front view of the apparatus according to the invention.
Figure 2:
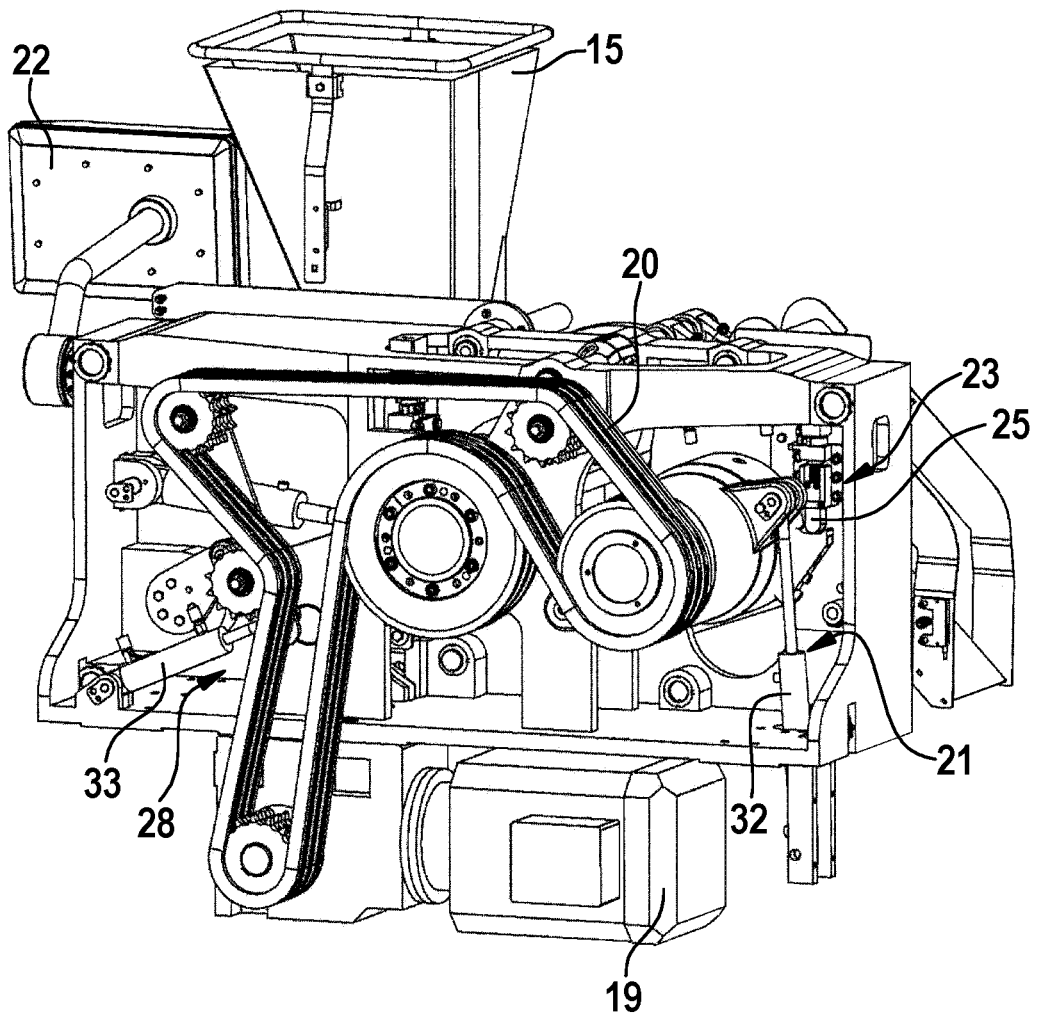
FIG. 2 is a perspective rear view of the apparatus according to the invention.

The apparatus according to the invention and the method according to the invention will be described in greater detail in the following. FIGS. 1 and 2 show perspective views of the apparatus according to the invention from the front and back respectively. The apparatus comprises a rotationally driven hollow drum 10 having a perforated peripheral surface 11. For the sake of clarity, the perforation is not shown in the drawing. The perforation of the peripheral surface 11 consists preferably of a plurality of holes distributed over the entire peripheral surface 11.

Inside, the hollow drum 10 has an inner chamber 12 from which the portion of the material to be pressed which is pressed through the perforation of the peripheral surface 11 is guided to the outside by means of a guide element 13. Stripping means 18 are arranged in the region of the peripheral surface 11 for stripping away the material to be pressed on the hollow drum 10. The distance or the pressing force of the stripping means 18 against the peripheral surface 11 of the hollow drum 10 is preferably designed to be adjustable.

A continuous compression belt 14 rests on the hollow drum 10 from the outside. The compression belt 14 wraps around a portion of the hollow drum 10, thus resting on a portion of the peripheral surface 11. In this way, the hollow drum 10 and the compression belt 14 form an intake wedge 36 for the material to be pressed. For example, the material to be pressed is fed to the apparatus according to the invention via a guide funnel 15 and thus arrives between hollow drum 10 and compression belt 14 via the intake wedge 36. The proportion of the material to be pressed with higher flowability passes through the perforation of the hollow drum 10 into the inner chamber 12 of the hollow drum 10, while the components of lower flowability remain in the region of the outer peripheral surface 11 of the hollow drum. They are removed from the peripheral surface 11 by the stripping means 18. The stripping means 18 are preferably configured to be controllable towards and away from the peripheral surface 11 such that the stripping process is only carried out in each case when it is necessary to free the peripheral surface 11 of material to be pressed and/or material residues to be pressed.

The compression belt 14 is mounted by means of a drive roller 16 and a bearing roller 17. A plurality of the drive rollers 16 and the bearing rollers 17 respectively can also be used for mounting or deflecting the compression belt 14. A drive means 19 is used to drive the hollow drum 10 and the drive roller 16. The drive is preferably effected by means of a drive chain 20. More preferably, the drive chain 20 is configured to drive the hollow drum 10 as well as the drive roller 16.

The drive roller 16 is designed such that it can be pressed in a controllably variable manner into a pressing position against the hollow drum 10, separated by the compression belt 14. For this purpose, the position of the drive roller 16 relative to the hollow drum 10 is adjustably set by means of a first positioning device 21 via a control device. In this way, it is possible to adjust the pressure of the compression belt 14 onto the hollow drum 10 in a controllably variable manner.

Figure 3:
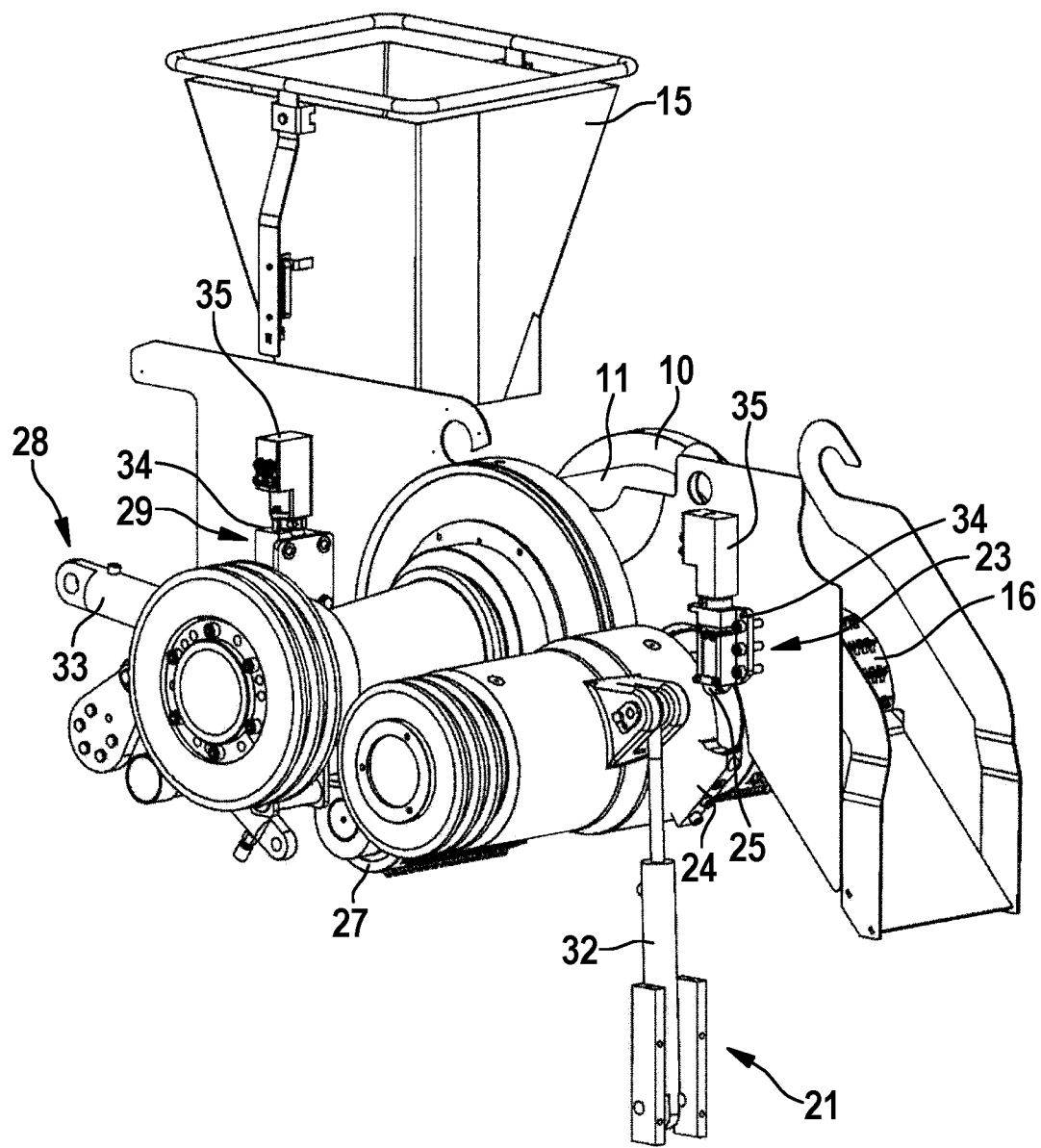
FIG. 3 is a rear view of the apparatus with a first end abutment element in a first standby position.
Figure 4:
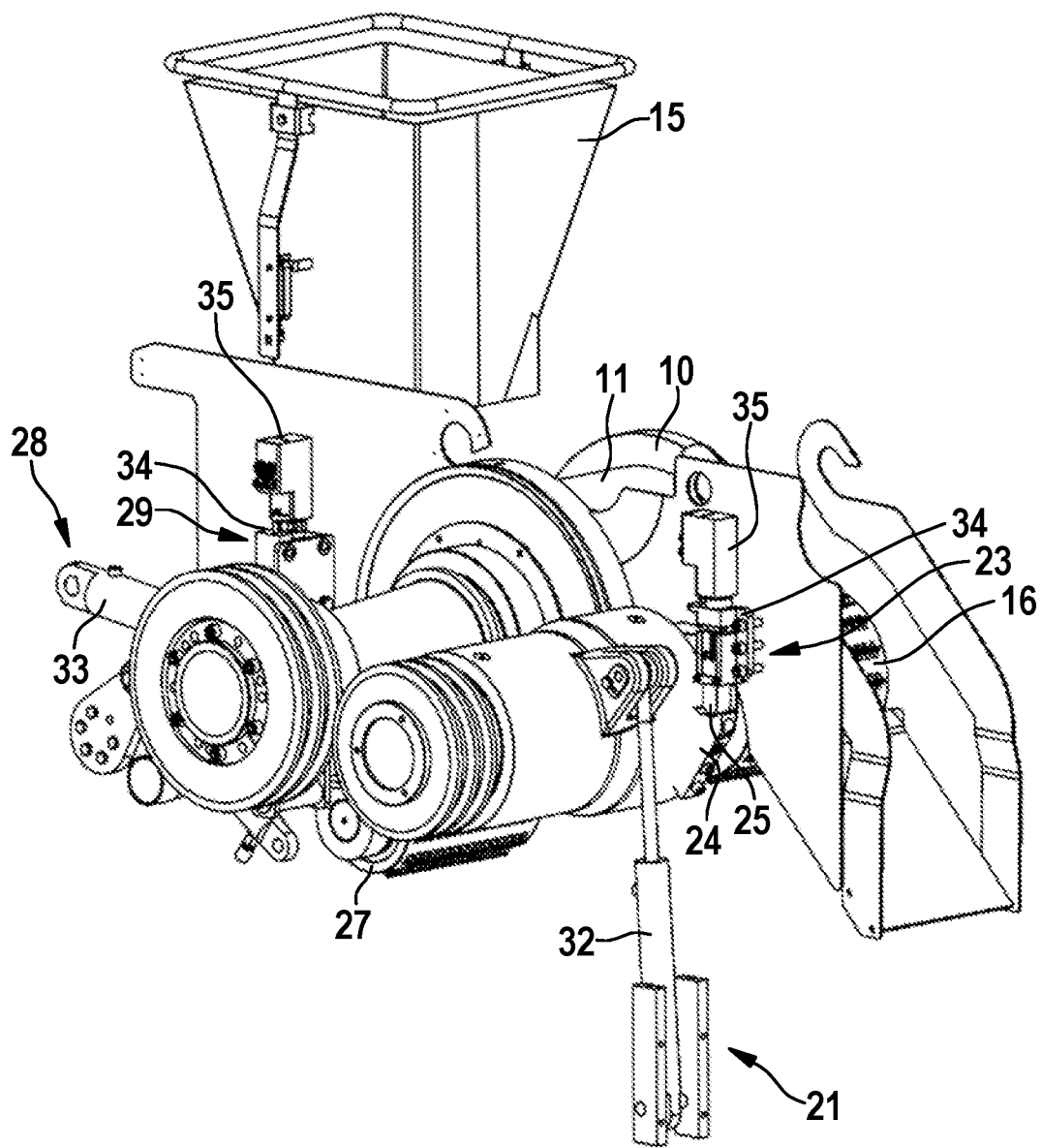
FIG. 4 is a rear view of the apparatus with the first end abutment element in a first contact position.

The apparatus according to the invention further comprises a first end abutment element 23 which is designed and configured for mechanical position limitation. FIGS. 3 and 4 show the basic function of this first end abutment element 23. For better illustration, FIG. 3 shows the first end abutment element 23 in a first standby position, while FIG. 4 shows it in a first contact position.

As can be seen in FIG. 4, at least one part 24 of the first positioning device 21 comes into blocking contact with a first counter-surface 25 of the first end abutment element 23 in the pressing position of the drive roller 16. In the pressing position, the drive roller 16 rests on the peripheral surface 11 of the hollow drum 10 with a predetermined contact pressure, at least separated by the compression belt 14. At the same time, at least one part 24 of the first positioning device 21 rests on the counter-surface 25 such that the end abutment element 23 prevents further movement of the drive roller 16 towards the hollow drum 10.

FIG. 3 shows the first positioning device as well as the drive roller 16 in a position in which the first counter-surface does not come into blocking contact with the at least one part 24 of the first positioning device 21. In this case, the first positioning device is mechanically unobstructed and can be moved into different positions by means of the control device 22. The mechanical position limitation only engages when the at least one part 24 of the first positioning device 21 comes into blocking contact with the counter-surface 25 of the first end abutment element 23.

The first counter-surface 25 of the first end abutment element 23 is designed such that its position can be adjusted by means of the control device 22. As shown in FIGS. 3 and 4, the first counter-surface 25 is designed such that it can be moved into different positions. In other words, the contact position is controllably variable.

The apparatus according to the invention preferably further comprises a rotationally driven continuous supporting means 26, designed to support the compression belt 14. The continuous supporting means 26, which is designed for example as a support belt or support chain, is mounted by means of the drive roller 16 and at least one tensioning roller 27. The supporting means 26 supports the compression belt 14 and is guided together with it around the drive roller 16.

Figure 5:
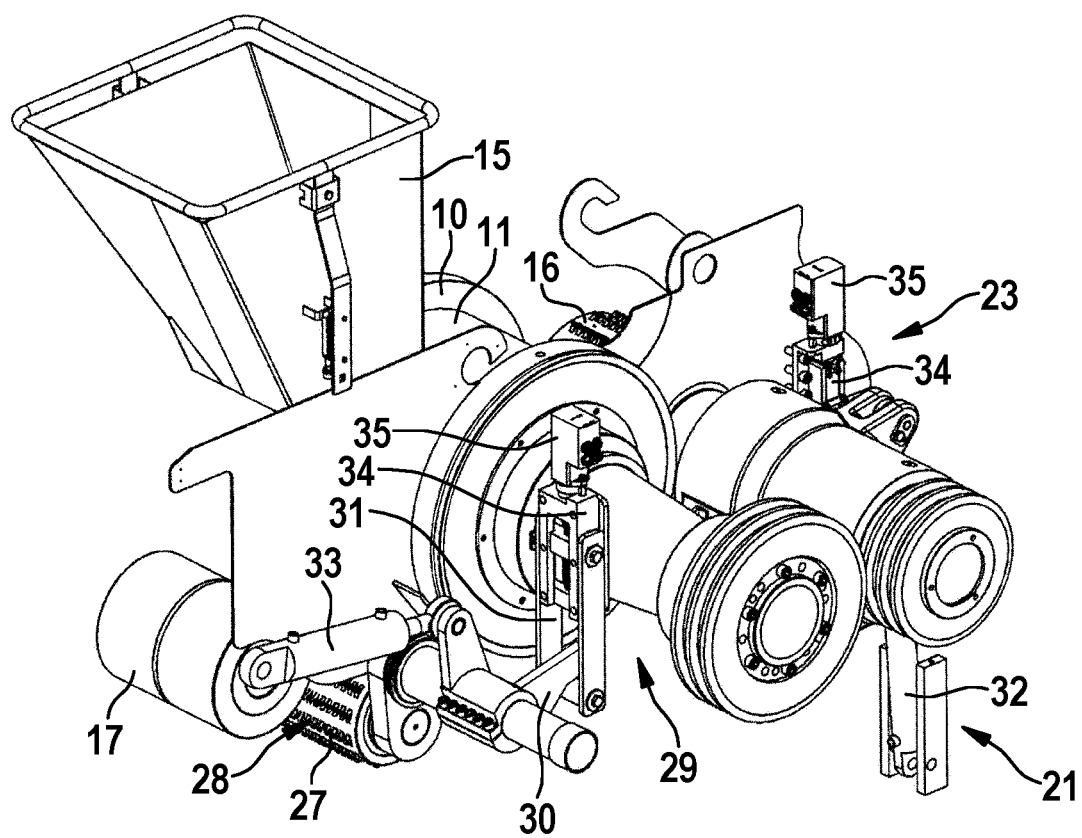
FIG. 5 is a rear view of the apparatus with a second end abutment element in a second standby position.
Figure 6:
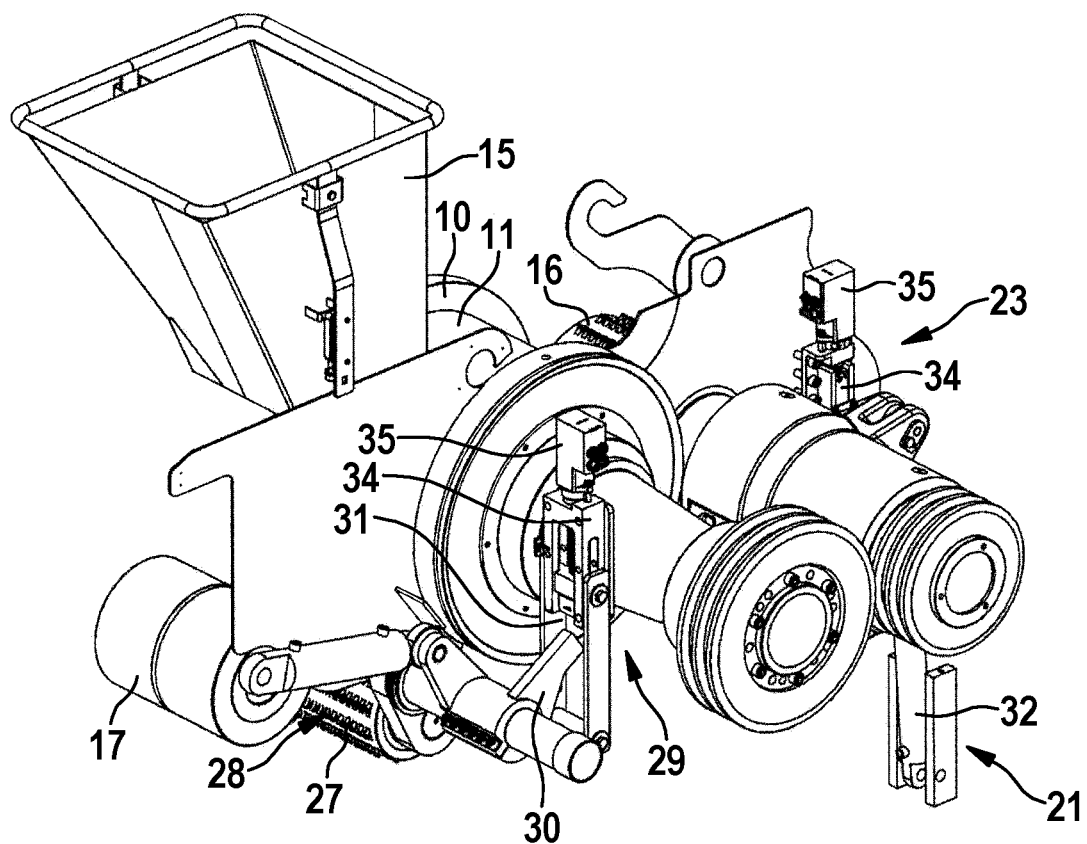
FIG. 6 is a rear view of the apparatus with the second end abutment element in the second contact position.

At least the position of the tensioning roller 27 is designed to be adjustable into a tensioning position by means of a second positioning device 28 via the control device 22 for adjusting the pre-tension of the supporting means 26. The second positioning device 28 is mechanically position-limited by means of a second end abutment element 29. For this purpose, at least one part 30 of the second positioning device 28 comes into blocking contact with a second counter-surface 31 of the second end abutment element 29 in the tensioning position. FIGS. 5 and 6 each show the mode of operation of the second end abutment element 29. While in FIG. 5 the second positioning device 28 is mechanically unobstructed, FIG. 6 show the at least one part 30 of the second positioning device in blocking contact.

The second counter-surface 31 of the second end abutment element 29 is designed such that its position can be adjusted by means of the control device 22. As shown in FIGS. 5 and 6, the second counter-surface 31 is designed such that it can be moved into different positions. In other words, the contact position is controllably variable.

The first and second positioning devices 21, 28 preferably each comprise hydraulically operated pressure cylinders 32, 33. The pressure cylinders 32, 33 are controlled and operated by means of the control device 22. The pressure cylinders 32, 33 are preferably integrated into a hydraulic system, not shown in the drawing, which is controlled by means of the control device 22 in such a manner that a predetermined hydraulic pressure can be applied to them, but they can yield resiliently against it. Alternatively, the pressure cylinders 32, 33 are pneumatic cylinders which can yield resiliently against the compressible compressed air medium.

More preferably, the counter-surfaces 25, 31 of the end abutment elements 23, 29 are each designed to be self-locking. The end abutment elements 23, 29 are thus designed in such a manner that the counter-surfaces 25, 31 automatically retain their position once it has been set, even when force is applied. For this purpose, the end abutment elements 23, 29 are designed, for example, to be self-locking or each comprise a controllable locking device for interlocking the set position of the respective counter-surface 25, 31.

In particular, the counter-surfaces 25, 31 of the end abutment elements 23, 29 each have an electric motor spindle drive 34 controllable by means of the control device 22 for adjusting the position of the counter-surfaces 25, 31. This has the advantage that the counter-surfaces 25, 31 self-lock when force is applied, i.e. retain their adjusted position. It is only possible to adjust the position of the counter-surfaces 25, 31 by operating an electric motor 35 of the spindle drive 34.

The end abutment elements 23, 29 each comprise measuring means, not shown in the drawing, connected to the control device 22 which are designed to detect that the respective counter-surface 25, 31 is in blocking contact. The measuring means are thus designed to detect whether the position adjustment of the counter-surfaces 25, 31 is taking place against a mechanical resistance or an increasing mechanical resistance. At least the following steps are performed by means of the control device 22:

First of all, the first counter-surface 25 of the first end abutment element 23 is moved into a first standby position in such a manner that the first positioning device 21 can be positioned without restriction, as is shown, for example, in FIG. 3. Then the drive roller 16 is moved into the pressing position by means of the first positioning device 21. This takes place by applying a pressing test pressure to the first pressure cylinder 32 such that the drive roller 16 rests against the hollow drum 10 with a predetermined test pressure force via the compression belt 14. The exact position of the drive roller 16 is determined at least by the diameter of the hollow drum 10, the thickness and elasticity of the compression belt 14, if necessary the overall height of the supporting means 26 and the magnitude of the pressing test pressure.

The first counter-surface 25 of the first end abutment element 23 is now moved from the first standby position into a first contact position, shown in FIG. 4, in which the first counter-surface 25 comes into blocking contact with at least one part 24 of the first positioning device 21. A pressing working pressure, which is greater than the pressing test pressure, is then applied to the first pressure cylinder 32. The at least one part 24 of the positioning device 21 now rests in blocking contact on the counter-surface 25 which mechanically limits the drive roller 16 from further approaching the hollow drum.

The following further steps are preferably performed by means of the control device. The second counter-surface 31 of the second end abutment element 29 is moved into a second standby position in such a manner that the second positioning device 28 can be positioned without restriction, as is shown, for example, in FIG. 5. Tensioning roller 27 is then moved into a tensioning position by means of the second positioning device 28. This takes place by applying a tensioning test pressure to the second pressure cylinder 33 such that a predetermined pre-tension acts upon the supporting means 26.

As shown in FIG. 6, the second counter-surface 31 of the second end abutment element 29 is now moved from the second standby position into a second contact position in which the second counter-surface 31 comes into blocking contact with at least one part 30 of the second positioning device 28. Subsequently, a tensioning working pressure, which is greater than the tensioning test pressure, is applied to the second pressure cylinder 33.

According to a further preferred embodiment of the invention, not shown in the drawing, before applying the pressing working pressure to the first pressure cylinder 32, the drive roller 16 is moved from the first pressing position by means of the first positioning device 21 into a first release position in such a manner that the compression belt 14 rests on the hollow drum 10, at best free from pressing force. For example, initiated by the control device 22, a pressure which is just sufficient to move the drive roller 16 into the said position is applied to the first pressure cylinder 32. The first counter-surface 25 of the first end abutment element 23 is then moved from the first contact position into a differential contact position, deviating therefrom by a predetermined first distance. In other words, a reference position is first determined in which the drive roller just comes into contact with the hollow drum 10, separated by the compression belt 14 and if necessary by the supporting means 26. By adjusting the first counter-surface 25 by the predetermined distance, it is possible to move the drive roller 16 into a defined position deviating from the reference position.

In a similar manner, it is further preferable, before applying the tensioning working pressure to the second pressure cylinder 33, to move the tensioning roller by means of the second positioning device 28 from the tensioning position into a second release position in such a manner that the supporting means 26 is at least substantially free from pre-tension. The second counter-surface 31 of the second end abutment element 29 is then moved from the second contact position into a differential tensioning position, deviating therefrom by a predetermined second distance.

More preferably, the counter-surfaces 25, 31 of the end abutment elements 23, 29 self-lock. Advantageously, the counter-surfaces 25,31 of the end abutment elements 23, 29 are each adjusted by means of electric motor spindle drives 34 controllable via the control device 22. The fact that the respective counter-surface 25, 31 is in blocking contact is preferably detected by determining the current consumption of the respective spindle drive 34 by means of current measuring devices during position adjustment of the respective counter-surface 25, 31. Reaching the blocking contact is detected during position adjustment in that the current measuring devices determine an increase in the current consumption which occurs with respect to the nominal current consumption of the spindle drive 34.

The present invention also comprises a method for operating an apparatus for separating materials with different degrees of flowability in which first of all the previously described method for setting up the apparatus is performed. The apparatus for separating the materials with different degrees of flowability is then operated, wherein the operation is repeatedly interrupted to perform the previously described method for setting up the apparatus. In other words, the actual performance of separating the materials in predetermined time intervals is interrupted in order to recalibrate the apparatus by periodically performing the setup operation according to the invention.

The invention claimed is:

1. An apparatus for separating materials with different degrees of flowability, comprising:
 a rotationally driven hollow drum having a perforated peripheral surface;
 a continuous compression belt which is pressed from outside onto the hollow drum by wrapping around a part of a circumference of the hollow drum, the belt forming, an intake wedge together with the hollow drum for the material to be pressed;
 wherein; the compression belt is mounted by means of at least one drive roller and at least one bearing roller, and at least the drive roller controllably presses in a variable manner into a pressing position against the hollow drum, separated by the compression belt, the position of the drive roller relative to the hollow drum is adjustably set by means of a first positioning device via a control device, further comprising;
 a first end abutment element for mechanical position limitation, with which at least one part of the first positioning device comes into blocking contact with a first counter-surface of the first end abutment element in the pressing position of the drive roller and wherein;
 the first counter-surface of the first end abutment element is adjustable by means of the control device.

2. The apparatus according to claim 1, further comprising a rotationally driven continuous supporting means supporting the compression belt, which is mounted by means of the drive roller and at least one tensioning roller;
 wherein at least a position of the tensioning roller is adjustable into a tensioning position by means of a second positioning device via the control device for adjusting the pre-tension of the supporting means;
 a second end abutment element for mechanical position limitation, with which at least one part of the second positioning device comes into blocking contact with a second counter-surface of the second end abutment element in the tensioning position and wherein;
 the second counter-surface of the second end abutment element is adjustable by means of the control device.

3. The apparatus according to claim 2, wherein the supporting means is a support chain or a support belt.

4. The apparatus according to claim 2, wherein the first and second positioning devices each comprise hydraulically operated pressure cylinders.

5. The apparatus according to claim 2, wherein the first and second counter-surfaces of the respective end abutment elements are each self-locking.

6. The apparatus according to claim 5, wherein the first and second counter-surfaces of the respective end abutment elements each have an electric-motor-operated spindle drive, which can be controlled by means of the control device, for adjusting the position of the counter-surfaces.

7. The apparatus according to claim 6, wherein the first and second end abutment each comprise measuring means connected to the control device which are designed to detect that the respective counter-surface is in blocking contact.

8. The apparatus according to claim 7, wherein each measuring means has a current measuring device for determining a current consumption of the spindle drive, and the control device detects that the respective counter-surface is in blocking contact in the event of an increase in the current consumption compared to a nominal current consumption of the spindle drive which is detected during position adjustment.

9. The apparatus according to claim 7, wherein the measuring means are contact-free position sensors or electrical limit switches.

10. The apparatus according to claim 2, wherein the control device stores the positions of the respective counter-surfaces using memory means for at least one type of material to be pressed and, after an operator has selected one of the material types to be pressed, to automatically adjust the counter-surfaces based on the stored positions.

11. A method for setting up an apparatus for separating materials with different degrees of flowability, comprising:
 providing an apparatus having;
 a rotationally driven hollow drum with a perforated peripheral surface,
 a continuous compression belt pressed from outside onto the hollow drum by wrapping around a part of a circumference of the hollow drum, and which forms the belt forming an intake wedge together with the hollow drum for the material to be pressed, wherein;
 the compression belt is mounted by means of at least one drive roller and at least one bearing roller, and at least the drive roller in a controllably presses in a variable manner into a pressing position against the hollow drum, separated by the compression belt
 the pressing position of the drive roller relative to the hollow drum being adjustably set by means of a first positioning device, which comprises at least one hydraulically operated first pressure cylinder, via a control device, further comprising;
 a first end abutment element for mechanical position limitation, with which at least one part of the first positioning device comes into blocking contact with a first counter-surface of the first end abutment element in the pressing position of the drive roller and wherein,
 the first counter-surface of the first end abutment element is adjustable by means of the control device, and at least the following steps are carried out by means of the control device:
 a) moving the first counter-surface of the first end abutment element into a first standby position in such a manner that the first positioning device can be positioned without restriction;
 b) positioning the drive roller into the pressing position by means of the first positioning device by applying a pressing test pressure to the first pressure cylinder such that the drive roller rests against the hollow drum with a predetermined test pressure force via the compression belt,
 c) moving the first counter-surface of the first end abutment element from the first standby position into a first contact position in which the first counter-surface comes into blocking contact with at least one part of the first positioning device, and d) applying a pressing working pressure, which is greater than the pressing test pressure, to the first pressure cylinder.

12. The method according to claim 11, wherein the apparatus has a rotationally driven continuous supporting means supporting the compression belt, the compression belt being mounted by the drive roller and at least one tensioning roller and at least a position of the tensioning roller is adjustable into a tensioning position by means of a second positioning device, via the control device for adjusting the pre-tension of the supporting means, and further a second end abutment element for mechanical position limitation with which at least one part of the second positioning device, which comprises at least one hydraulically operated second pressure cylinder, comes into blocking contact with a second counter-surface of the second end abutment element in the tensioning position, and wherein the second counter-surface of the second end abutment element is adjustable by means of the control device and the following further steps can be carried out by means of the control device:

e) moving the second counter-surface of the second end abutment element into a second standby position in such a manner that the second positioning device can be positioned without restriction;

f) positioning the tensioning roller into a tensioning position by means of the second positioning device by apply a tensioning test pressure to the second pressure cylinder such that a predetermined pre-tension acts upon the supporting means;

g) adjusting the second counter-surface of the second end abutment element from the second standby position into a second contact position in which the second counter-surface comes into blocking contact with at least one part of the second positioning device; and h) applying a tensioning working pressure, which is greater than the tensioning test pressure, to the second pressure cylinder.

13. The method according to claim 11, wherein before applying the pressing working pressure to the first pressure cylinder;

the drive roller is moved from the first pressing position by means of the first positioning device into a first release position in such a manner that the compression belt rests on the hollow drum; and the first counter-surface of the first end abutment element is moved from the first contact position into a differential contact position, deviating therefrom by a predetermined first distance.

14. The method according to claim 12, wherein before applying the tensioning working pressure to the second pressure cylinder;

the tensioning roller is moved by means of the second positioning device from the tensioning position into a second release position in such a manner that the supporting means is at least substantially free from pre-tension; and the second counter-surface of the second end abutment element is moved from the second contact position into a differential tensioning position, deviating therefrom by a predetermined second distance.

15. The method according to claim 12, wherein the first and second counter-surfaces of the respective end abutment elements self-lock.

16. The method according to claim 15, wherein the first and second end abutment elements are each adjusted by means of electric motor spindle drives controllable via the control device.

17. The method according to claim 16, further comprising determining current consumption of the respective spindle drive by means of current measuring devices during position adjustment of the respective counter-surface and detecting that the respective counter-surface is in blocking contact in the event of an increase in the current consumption compared to a nominal current consumption of the spindle drive which is detected during position adjustment.

18. The method according to claim 16, further comprising detecting the blocking contact using contact-free position sensors or electrical limit switches.

19. The method according to claim 12, further comprising storing the positions of the respective counter-surfaces using memory means of the control device for at least one type of material to be pressed and, after an operator has selected the material type to be pressed, automatically adjusting the position of the respective counter-surfaces based on the stored positions.

20. A method for operating an apparatus for separating materials with different flowability, comprising the steps:

Performing the method for setting up the apparatus according to claim 11,

Performing separation of the materials with different degrees of flowability by actuating the drive roller; and Repeatedly interrupting the performance of separating the materials and performing the method for setting up the apparatus according to claim 11.

* * * * *